Nov. 17, 1970   P. J. BRANCHU   3,540,137
APPARATUS INTENDED FOR SIMULATING SPACE MEETINGS
Filed Dec. 19, 1967   3 Sheets-Sheet 1
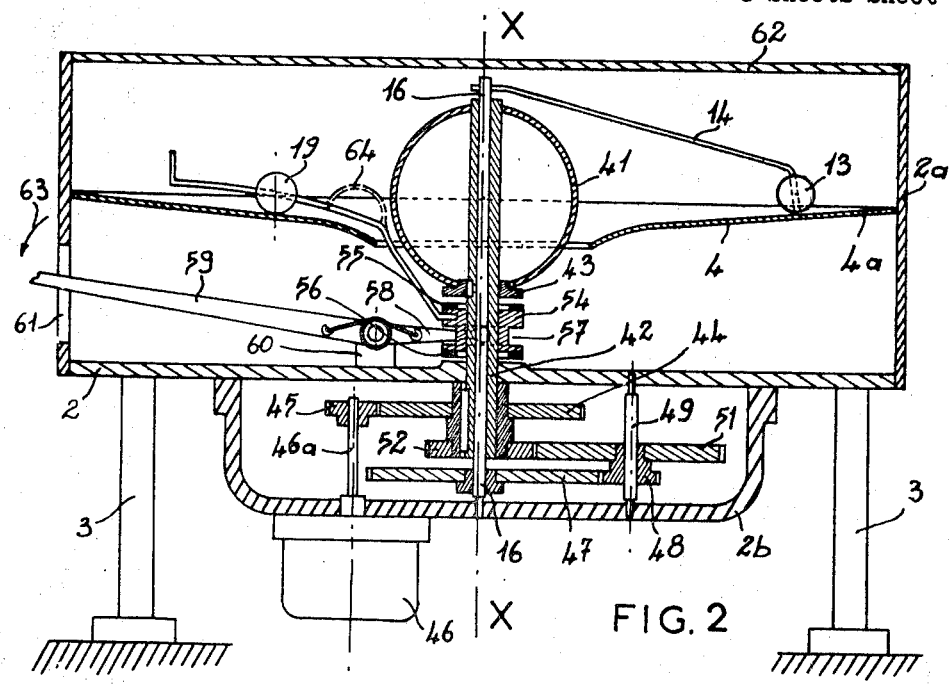
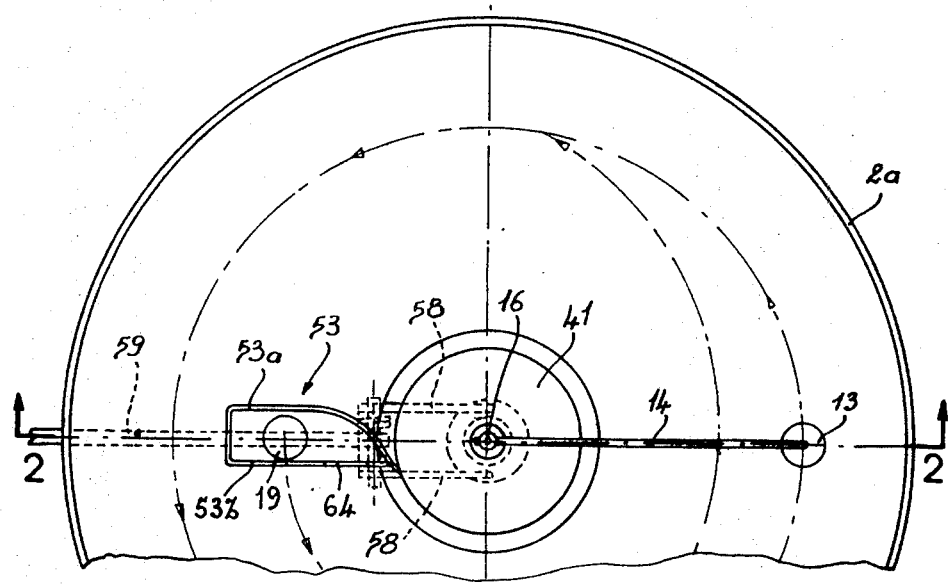

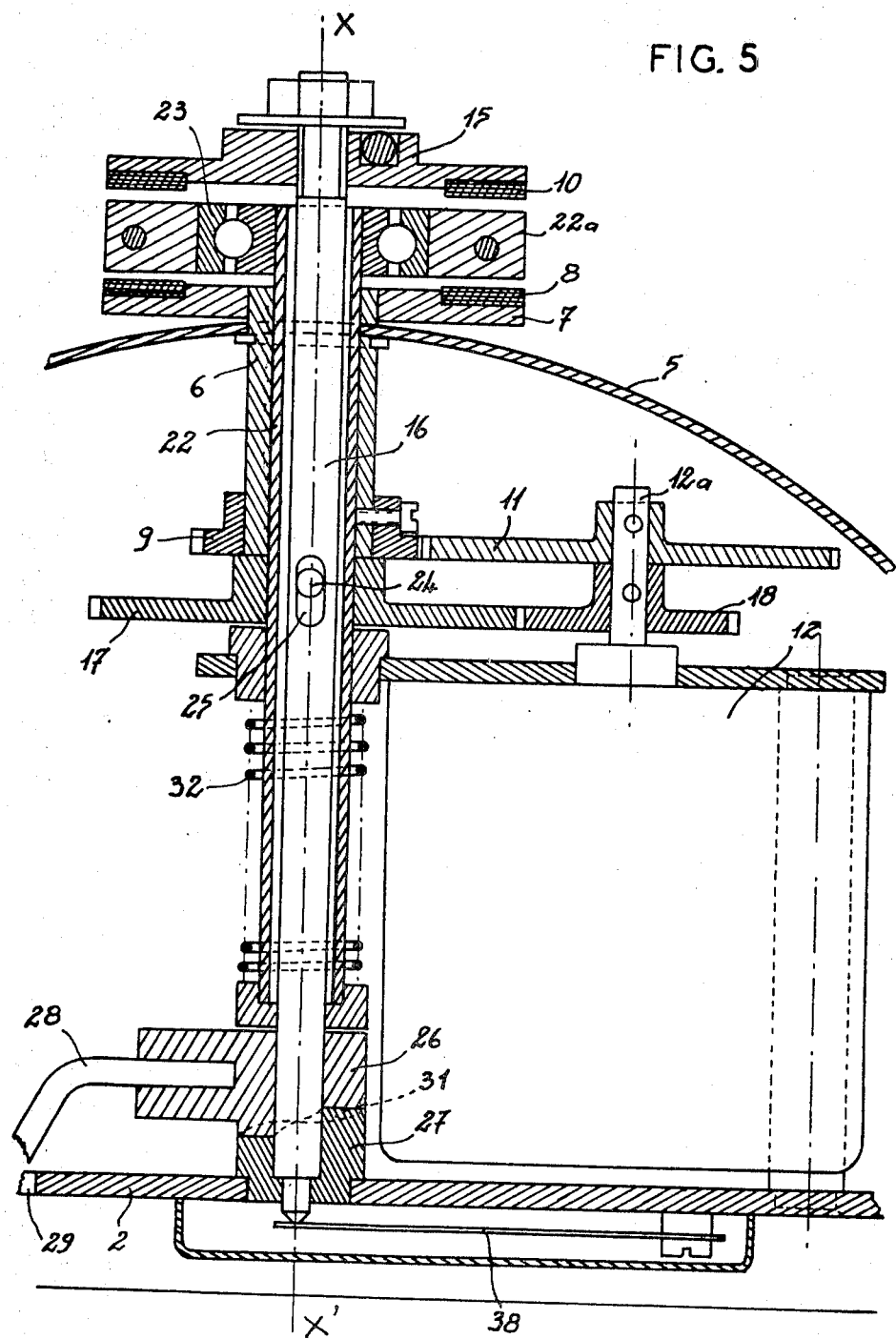

United States Patent Office 3,540,137
Patented Nov. 17, 1970

3,540,137
APPARATUS INTENDED FOR SIMULATING SPACE MEETINGS
Paul Joseph Branchu, 119 Boulevard de Greuelle, Paris, France
Filed Dec. 19, 1967, Ser. No. 691,757
Claims priority, application France, Dec. 21, 1966, 88,256; Nov. 29, 1967, 49,379
Int. Cl. G09b 27/00; B64g 7/00; K63h 33/26
U.S. Cl. 35—47                         10 Claims

ABSTRACT OF THE DISCLOSURE

A space rendezvous simulator has a dish representing an orbit, a planet at the center of the dish, a satellite in regular orbit of the planet near the edge of the dish, a steered body (capsule) simulator rolling freely on the dish, a drive mechanism for the planet and satellite, and a starting and steering pulse device for the body.

The generating curve of the dish provides that gravity acting on the body and the reaction of the dish result in a centripetal force inversely proportional to the square of the distance between the body and the dish axis.

---

The present invention relates to an apparatus for simulating space flights, during which an operator is able to steer a moving body subject to gravitation laws, and achieve "gentle" landings on a satellite, or meetings of two spatial capsules.

The apparatus of the invention comprises:

A stationary horizontal circular dish, the generatrix of which is a curve inclined downwards and inwards, while a sphere simulating a planet such as earth, and carried by a vertical tubular shaft, is disposed at the center of said dish;

A second sphere of smaller diameter than the first-mentioned sphere, which simulates a satellite having a regular orbit, such as the moon or any other natural or man-made satellite, said second sphere being held very close to the above-mentioned dish, near the outer edge of the latter, by the radial arm of a vertical shaft, which is coaxial to the above-mentioned tubular shaft;

A speed reducing driving assembly, which rotates the respective shafts of the planet and satellite at different speeds, so as to reproduce, for instance, the motions of earth and moon;

Lastly, a third sphere or ball simulating a space capsule or any other moving body, and adapted to roll freely on the upper surface of the above-mentioned dish, the generating curve of the latter being determined so that the resultant of the gravity acting on the steered moving body and of the reaction generated by the dish is a centripetal force, inversely proportional to the square of the distance between the steered moving body and the axis of said dish, means being provided for supplying said moving body with starting and steering impulses.

In order to show that a "gentle" boarding has been carried out successfully, the moving body is magnetized, while the satellite is made of magnetic metal, so that, after a gentle contact, said moving body and said satellite keep adhering to each other, it being possible to part them, because of the inertia of the steered moving body, by stopping and then restarting the motor driving the apparatus, that is, stopping and restarting the satellite.

According to a first embodiment of the apparatus of the invention, the means for supplying the sphere or ball simulating the steered moving body with starting and steering impulses, comprise a forked lever, between the prongs of which said ball rests normally on the dish, said lever being radially integral with a sleeve mounted so as to be able to slide vertically over the lower portion of the tubular shaft, said sleeve carrying at each of its ends a friction packing, one of which is adapted to be brought into contact with a disk provided with friction packings and integral with the shaft driving the planet, said disk being located above said sleeve, while the other end packing is adapted to engage a second disk provided with friction packings, said second disk being located below said sleeve, and integral with the base of the apparatus.

Consequently, by moving said sleeve upwards, the operator is able to rotate same until the speed thereof is equal to that of the planet. However, as said speed is higher than that of the satellite, it is obviously too high to succeed in carrying out a space meeting. Consequently, the operator should make the sleeve slide with respect to the driving disk, which is achieved easily, since the driving torque of said sleeve is proportional to the pressure exerted on the control lever by the operator.

Conversely, by moving said sleeve downwards, the operator causes the braking thereof.

The means enabling the movements of the above-mentioned sleeve to be controlled may comprise a lever pivotally mounted in a strap integral with the base of the apparatus, said lever having a forked end engaging a groove on the periphery of said sleeve, while its other end is accessible from the outside of the transparent case which protects the apparatus. In this embodiment, the speed reducing motor assembly used for driving the shafts of the planet and the satellite is entirely located below the base of the apparatus.

According to a modified embodiment of the invention, the dish has a central cut out portion of circular shape, and the sphere simulating the planet or earth is merely a portion of a sphere cut along a horizontal plane lying below the level of the above-mentioned cut out portion, while the reducing motor assembly is housed inside said portion of a sphere, and the sleeve used for driving the moving body is located above the top of said portion of a sphere.

Said arrangement is advantageous in that the space taken up by the apparatus is reduced substantially, while the volume of the planet is used rationally.

To enable the duration of the attempts to achieve space meetings to be limited, a circular groove or trough is provided at the periphery of the dish supporting the moving body, into which trough the moving body falls if it passes beyond the edge of said dish, as a result of being launched at too high a speed, said trough being provided, however with a spiral incline, which enables said moving body to be recovered at a predetermined point.

Alternatively, again for limiting the duration of the attempts to achieve space meetings, a switch is provided on the supply circuit for the motor, which switch is housed inside the apparatus, close to a toothed wheel provided with a lug, which, each time said toothed wheel revolves, causes said switch to open, said toothed wheel being in turn rotated by impulses given in succession thereto by a tooth secured radially to the driving shaft for the satellite.

The duration of an attempt to achieve space meetings will thus be limited by the time required by the satellite for performing a determined number of revolutions, which number is in turn determined by the number of teeth on the above-mentioned toothed wheel.

As already mentioned hereinabove, the satellite is magnetized, while the moving body is made of magnetic metal, since magnetization is absolutely necessary for judging whether the "gentle" meetings are properly achieved. However, to enable only the gentle boardings to be considered as successful meetings, and according to an advantageous embodiment of the invention, either the satellite, or the steered moving body, is covered with a resilient shell, which causes it to rebound under the action of shocks.

According to a further feature of the invention, the forked lever radially integral with the sleeve used for driving the moving body, is also used for supporting said moving body, the spacing of the prongs of the fork of said lever being smaller than the width of the moving body, and adapted to receive runners fitted to said moving body. Said prongs have sections which reproduce a curve determined so that the resultant of the gravity acting on the moving body and of the reaction generated by said prongs is a centripetal force, which is inversely proportional to the square of the distance between said moving body and the vertical axis of the planet.

Said arrangement allows thus cutting out the dish and, consequently, reducing the cost of the apparatus.

Along the same line of thought, the forked lever supporting the moving body may be replaced by a single arm, along which said moving body would be movable in both directions, under the action of the difference between the centrifugal force and the centripetal force.

As previously mentioned hereinabove, the sleeve used for driving the moving body may be subjected to the action of two disks, one of which is stationary, while the other is rotated at the same speed as the planet.

According to a modification, the sleeve used for driving the moving body is provided with a flange, while a ball bearing is interposed between said sleeve and said flange, the latter being disposed between two disks, one of which is integral with the shaft driving the planet, while the other is integral with the shaft driving the satellite. Said sleeve is, of course, adapted to be moved axially, so that its flange can be brought into contact with either of the two above-mentioned disks, while means are provided for holding it normally in neutral position.

The control means for the axial movements of the sleeve driving the moving body consist advantageously in two auxiliary sleeves disposed end to end in coaxial relationship with the shafts driving the planet and the satellite, the contacting surfaces of said auxiliary sleeves having helical sections, the lower auxiliary sleeve being stationary, while the upper auxiliary sleeve, on which the sleeve driving the moving body rests, is adapted to be rotatively driven in either direction by means of a control lever accessible from the outside of the apparatus.

The invention will now be described in greater detail in the following description, with reference to the appended diagrammatic drawing, which illustrates, by way of non-limiting examples, some embodiments of the apparatus of the invention. In said drawing:

FIG. 1 is a partial top plan view of a first embodiment of said apparatus;

FIG. 2 is a sectional view along line 2—2 of FIG. 1;

FIG. 5 is, on an enlarged scale, a partial view of the apparatus of FIG. 4, in axial section;

Figure 3:
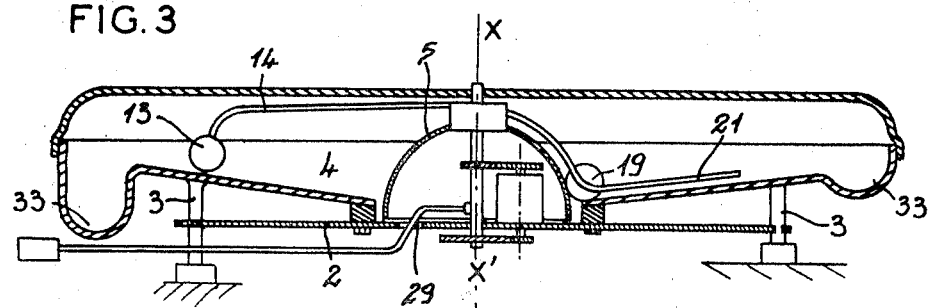
FIG. 3 is a view of said apparatus in axial section, according to a first modified embodiment.

Referring now to FIGS. 1 and 2, the apparatus according to the invention includes a base plate 2, provided with three legs 3, the length of which is adjustable.

The base plate 2 supports a cylindrical shell 2a, to which a circular dish 4 is secured, the generatrix of said dish being a curve inclined downwards and inwards.

The center of said dish 4 is cut out, so as to house partially a sphere 41, the vertical diameter of which merges into the vertical axis X–X′ of the dish 4. Said sphere 41 is intended for simulating a planet such as earth, and is carried by a tubular shaft 42, the axis of which merges also into the axis X–X′ of the dish 4. The sphere 41 is fastened to the tubular shaft 42 through a disk 43 keyed to said shaft 42, and integral with the sphere 41 at the lower pole of the latter.

A pinion 44 is keyed to the lower end of the shaft 42, that is, that end located below the base plate 2, said pinion 44 driving the shaft 42 through a pinion 45 keyed to the shaft 46a of the electric motor 46 located below the base plate 2.

The satellite revolving around the planet 41 is constituted by a sphere 13 of a smaller diameter than said planet 41, which sphere 13 is carried very close to the dish 4, near to the peripheral edge 4a thereof, by a rod 14, which rod 14 is secured radially to the upper end of a vertical shaft 16, which is coaxial to the tubular shaft 42, the lower end of said shaft 16 resting on a case 2b added below the base plate 2. A pinion 47 is keyed to said shaft 16, and gears with a pinion 48 keyed to an auxiliary vertical shaft 49. A second pinion 51 is also keyed to said auxiliary shaft 49, and gears with a pinion 52 keyed to the lower end of the tubular shaft 42.

The rotation of the shaft 16, and, consequently, of the satellite 13, is effected by the tubular shaft 42, through the pinions 52, 51, 48, and 47, the gear ratio of the teeth of said pinions allowing a reduction of the speed at which the satellite 13 revolves with respect to that of the planet 41, so as to reproduce approximately the relative movements of a planet and the satellite thereof.

The moving body with which the space meetings should be achieved consists of a ball 19, which rests on the dish 4; said ball 19 is framed by the two prongs 53a, 53b, of the forked lever 53, the latter being secured radially to a sleeve 54 mounted on the tubular shaft 42 between the disk 43 and the base plate 2, and free to rotate and move axially therebetween.

Said sleeve 54 is provided with friction packings 55, 56, respectively, at each of its ends. The middle portion of said sleeve is provided with a groove 57, which is engaged by the forked end 58 of a lever 59 pivoted in a strap 60 carried by the base plate 2. The free end of said lever 59 passes through a vertical elongated hole 61 in the cylindrical shell 2a, which enables said lever to be gripped from the outside of the apparatus. Lastly, the cylindrical shell 2a is closed at the top by a transparent plate 62.

In order to simulate the behavior of space bodies subjected to the attraction of a planet such as earth, the moving body 19 is therefore used, said body being adapted to move in any direction on the upper surface of the dish 4, with only a very low friction. It has been mentioned hereinabove that the generating curve of said dish is inclined downwards and inwards. Said curve is calculated in a manner such that the resultant of the weight of the moving body 19 and of the reaction of the dish 4 is a centripetal force, which is inversely proportional to the square of the distance between the moving body 19 and the axis X–X′. As a result, the moving body 19, after being launched at a certain speed, revolves according to an elliptic orbit resulting from the opposition of the centrifugal force and the centripetal force, as defined hereinabove.

To obtain such a result, the profile of the dish 4 is defined by the equation:

$$f = mgtg\alpha = K/r^2$$

in which $f$ is the centripetal force, $\alpha$ is the inclination of the profile as a function of the distance $r$ to the center of the dish (in order to simplify the calculation, $r$ may be replaced by the distance from the "capsule" to a vertical axis passing through the center of the dish, the error being negligible if said dish is sufficiently flat), $m$ is the mass of the moving body, $g$ is the gravity acceleration, and $K$ is a constant.

Through integration, it is immediately found that $$y-y_0 = K/r$$

From the above description, it will be seen that the moving body 19 is set going through the lever 53, which lever is adapted to be rotated up to a maximum speed corresponding to the speed of revolution of the planet 41, as a result of the sleeve 54 moving upwards under the action of the lever 59 being depressed in the direction of the arrow 63.

To launch the moving body 19 under conditions fairly similar to a launching through the medium of a rocket, the lever 59 is therefore manipulated in the direction of the arrow 63 for engaging the sleeve 54 with the disk 43, the inclination of the central portion of the dish 4 being greater with respect to the calculated curve. The moving body 19 is thus rotated by the lever 53, and moves away from the axis X–X' under the action of centrifugal force, until it leaves completely the lever 53 and meets possibly the satellite 13. In order that such space meeting be successful, it is obviously necessary that the moving body 19 board the satellite 13 "gently." To this end, the operator should manipulate the lever 59 to effect trajectory corrections, so as to maintain the moving body 19 on a waiting orbit, slightly lower than that of the satellite 13, and then, at the moment he judges that the relative positions of the moving body 19 and the satellite 13 are suitable, it is only necessary for him to accelerate the rotation of the moving body 19, so as to make the latter rise onto the orbit of the satellite 13, at a distance from the latter so small as to enable the magnetic field of attraction to ensure a "gentle" boarding, said magnetic field being created either by the moving body 19 or by the satellite 13, one of the latter being magnetized, while the other is made of magnetic material.

The recovery of the moving body 19 between the prongs 53a, 53b of the forked lever 53 is furthered by a ring bow 64 positioned at the root of the prong 53b, under which ring bow the moving body 19 can pass when being recovered by the lever 53.

Manipulating the lever 59 in the opposite direction to the arrow 63 brings the packing 56 of the sleeve 54 into contact with the base plate 2, which allows braking the rotation of the moving body 19, should the operator think it necessary.

Figure 4:
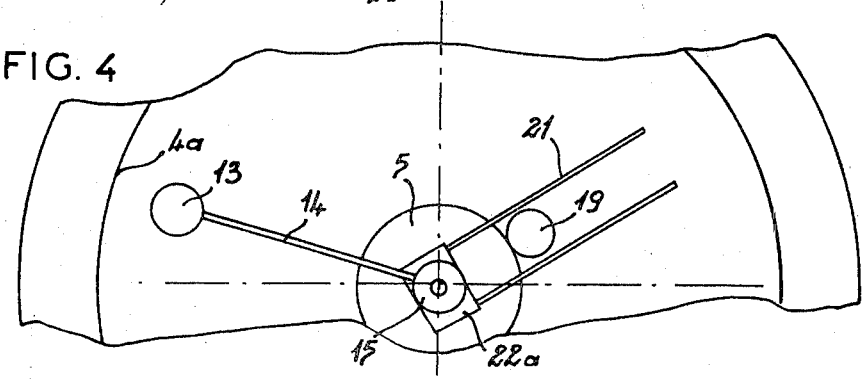
FIG. 4 is a partial top plan view of the apparatus of FIG. 3.

In the embodiment shown in FIGS. 3 and 4, there are, like in the example just described, a base plate 2, provided with three legs 3, the length of which is adjustable, a circular dish 4 supported by said base plate 2, the profile of the generatrix of said dish being inclined downwards and inwards.

The central portion of said dish 4 is cut out in a circle, which allows inserting partially a portion of a sphere 5, the top of which is located on the axis X–X' of the dish 4, above the latter.

As shown in FIG. 3, the portion of a sphere 5 is supported by a tubular shaft 6, the axis of which merges into the axis X–X'. Shaid tubular shaft 6 passes through the portion of a sphere 5, which is secured rigidly thereto. The upper end of the tubular shaft 6, that is, that end outside the portion of a sphere 5, carries a disk 7, the upper side of which is provided with an annular friction packing 8 (FIG. 5).

The lower end of said shaft 6, that is, that end inside the portion of a sphere 5, is provided with a pinion 9, adapted to drive said shaft 6 rotatably through a toothed wheel 11 keyed to the shaft 12a of an electric motor 12 housed inside the portion of a sphere 5, as shown in FIG. 5. Said portion of a sphere 5 is intended for simulating a planet, such as earth.

The satellite revolving around the planet 5 is constituted, as shown in FIGS. 3 and 4, by a sphere 13 of a smaller diameter than the portion of a sphere 5, which sphere 13 is carried very close to the dish 4, near to the peripheral edge 4a thereof, by a rod 14, which rod 14 is secured radially to a disk 15 coaxial to the tubular shaft 6 and positioned above the latter. Said disk 15 is provided at its underside with a friction packing 10, and is keyed to the upper end of a shaft 16, said shaft 16 being coaxial to the shaft 6, through which it passes throughout the length thereof, and resting on the base plate 2. The shaft 16 is rotated by a pinion 17 keyed thereto below the pinion 9. Said pinion 17 is in turn rotated by a pinion 18 keyed to the shaft 12a of the electric motor 12. The gear ratios of the pinions 9 and 11, on the one hand, and 17 and 18, on the other hand, determine the ratios of the speeds of rotation of the shafts 6 and 16. As may be seen from FIG. 5, the speed of rotation of the portion of a sphere 5 is higher than the speed of revolution of the satellite 13. The ratios of said speeds are, besides, determined so as to reproduce approximately the movements of a planet and its satellite.

In the examples shown in FIGS. 3 and 4, the steered moving body consists of a ball 19 supported by the dish 4, the driving of said ball being obtained by means of a forked lever 21, between the prongs of which it is positioned, so as to be driven around the planet 5. Each prong of said forked lever 21 has one of its ends secured to the flange 22a of a tubular sleeve 22, disposed vertically between the central shaft 16 and the tubular shaft 6. Said sleeve 22 extends substantially below the pinions 9 and 17. The flange 2a of said sleeve 22 is disposed between the friction packings 8, 10, respectively, of the disks 7, 15.

The tubular shaft 6 is adapted to rotate freely over the sleeve 22, but the assembling requirements result in its being rotated at the same speed as the pinion 17 and, consequently the central shaft 16. To obviate this drawback, a ball bearing 23 is interposed between the sleeve 22 and the flange 22a thereof, which ensures the free rotation of the latter.

As shown in FIG. 5, the pin 24, which keys the pinion 17 to the central shaft 16, passes through the sleeve 22 by means of two longitudinal slots 25, which enables said sleeve 22 to move axially, the amplitude of such axial movements being a function of the length of said slots.

The foot of the sleeve 22 rests on two auxiliary sleeves 26, 27, which are mounted end to end on the lower end of the central shaft 16. The auxiliary sleeve 27 is connected rigidly to the base plate 2, while the upper auxiliary sleeve 26 is freely mounted on the central shaft 16, and is adapted to be rotated by means of a radial lever 28, which passes through the base plate 2 through a slot in the shape of an arc of a circle 29, the length of said lever 28 limiting the amplitude of the rotations of the sleeve 26 in both directions.

Lastly, the contacting surfaces of said sleeves 26, 27 have a helical profile 31. As a result, when the auxiliary sleeve 26 rotates in either direction, it moves axially along the central shaft 16 at the same time, which axial movement is, of course, transmitted to the sleeve 22. A spring 32 holds at all times the lower end of said sleeve 22 bearing against the upper side of the auxiliary sleeve 26.

As will be seen readily, the axial movements of the sleeve 22, which are controlled by the lever 28, result in the flange 22a of said sleeve being brought into contact with the packing 8 of the disk 7, or with the packing 10 of the disk 15. Thus, the lever 28 allows controlling the rotation of the flange 22a and, consequently, of the lever 21 at the same speed as the planet 5, which is too high a speed for a successful space meeting, or at any intermediate speed, by sliding said flange 22a of the sleeve 22 with respect to the packing 8 of the disk 7, or the slowing down of said flange to the same speed as the satellite 13. The sliding of the flange 22a with respect to the packing 8 of the disk 7 is readily performed by reducing the pressure exerted by the operator on the control lever 28.

The operation of the apparatus just described is therefore comparable in every way with that of the apparatus shown in FIGS. 1 and 2, taking into account that the braking of the moving body 19 until its speed is zero can only result from the frictions, the flange 22a being then held in a neutral position.

To limit the duration of the attempts to achieve space meetings of the moving body 19 and the satellite 13, an annular groove or trough 33 may be provided at the periphery 4a of the dish 4, as shown in FIG. 3, the bottom of said trough being provided with a helical incline. As a result, if too high a speed is transmitted to the moving body 19, because of the centrifugal force, said body passes beyond the edge 4a of the dish 4, and falls into the trough 33, at the bottom of which it may be recovered. Said moving body 19 is then positioned again in the forked lever 21 through a ring bow provided at the root of the front prong of said lever 21, under which ring bow said moving body is adapted to pass.

Figure 6:
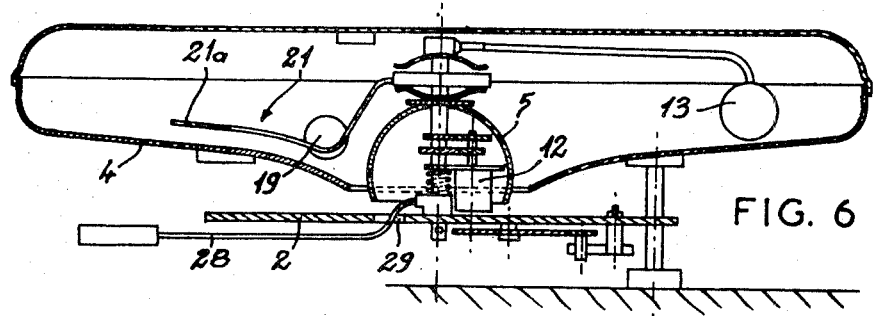
FIG. 6 is a view in axial section, similar to FIGS. 2 and 3, but illustrating a further modified embodiment of the apparatus of the invention.
Figure 7:
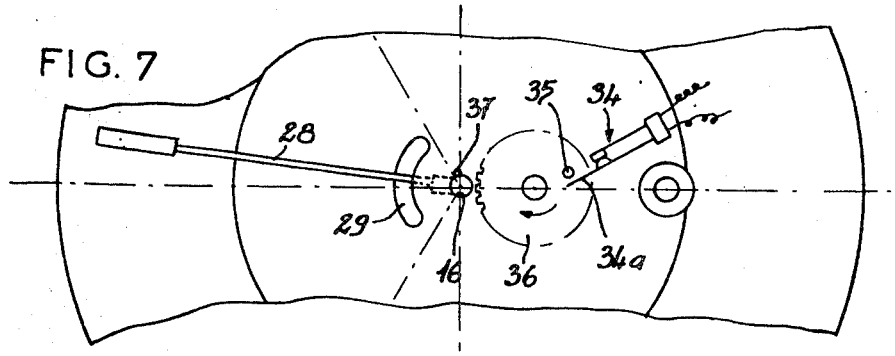
FIG. 7 is a partial plan view of the apparatus of FIG. 6, as seen from below.

As shown in FIGS. 6 and 7, another way of limiting the duration of space meetings can be provided, wherein the power supply to the motor 12 is ensured by a switch 34 secured to the base plate 2. The control lever 34a for opening said switch 34, is disposed on the path of a lug 35 carried laterally by a toothed wheel 36, the axis of which is vertical. Said toothed wheel 36 is rotated by impulses given in succession thereto by a tooth 37, secured radially to the lower end of the shaft 16. The maximum duration of attempts to achieve space meetings corresponds thus to one turn of the toothed wheel 36, and the duration of said turn is determined by the number of teeth on said toothed wheel 36, since the latter moves one tooth each time the satellite 13 performs one revolution.

According to a modification shown in FIG. 6, the spacing of the prongs 21a of the lever 21 is smaller than the diameter of the moving body 19, so that the latter rests on said prongs, the profile of which is similar to that of the generatrix of the dish 4, this being all the less a nuisance as the switch 34 has been provided for limiting the duration of attempts to achieve space meetings.

Along the same line of thought, the moving body 19 could be in the shape of a space capsule, and be provided with runners, for which the prongs of the lever 21 would be used as rails. Of course, buffers should then be provided at the free ends of the prongs of said lever 21.

Other arrangements may be provided for making the apparatus more interesting, such as, in particular, a counting system for successful space meetings, comprising an electric pulse counter. Each pulse corresponding to a successful meeting is transmitted, when the moving body 19 and the satellite 13 come into contact, by a flexible conducting strip 38 (FIG. 5), which is in contact with the shaft 16, on the one hand, and by a conducting area provided on the upper surface of the dish, in register with a point of the circular orbit of the satellite 13.

To prevent scoring one point at each revolution performed by the moving body after a successful meeting, the movable armature of the electro-magnet actuating the counter, carries the movable contact of a switch, so as to cut off the power supply to the motor as soon as the first pulse is counted, while the next start causes the moving body to be released, and to fall against the planet.

Alternatively, a slightly delayed recorder may be provided, which is only sensitive to a prolonged contact between the moving body 19 and the satellite 13.

Obviously, the invention is not limited to the sole embodiments thereof, described hereinabove by way of non-limiting examples. It covers, on the contrary, all modifications thereof falling within the scope of the appended claims. Thus, for instance, when the moving body is supported by its driving lever, the dish being then omitted, the apparatus may be suspended from the ceiling of a room, which allows making it large-sized without the space taken up by the apparatus being a nuisance, in which case, of course, the base of said apparatus is turned upside down, its legs being used to hang it up and adjust its horizontality.

What I claim is:

1. In an apparatus for simulating space meetings comprising a circular dish provided with an outer periphery, means for fixedly supporting horizontally said circular dish, a first body for simulating a planet, first drive means including a vertical tubular shaft for rotating and supporting said first body at the center of said circular dish, a second body for simulating a satellite, second drive means including a vertical shaft mounted concentrically in said tubular shaft for rotating and supporting said second body circularly along said outer periphery of said circular dish, and a third body for simulating a steered moving body, the improvement comprising control means for constraining said third body to roll freely on said dish and for imparting starting and steering pulses to said third body, said control means comprising a forked limb provided with a free end including a pair of legs between which legs said third body freely engages said dish, a sleeve slidably supported vertically on said vertical tubular shaft, said forked limb being fixedly connected to said sleeve, said sleeve including opposite end portions, a friction packing mounted on each of the opposite end portions of said sleeve, upper disk means coaxially mounted on said vertical tubular shaft above said sleeve, lower disk means mounted coaxially with said vertical tubular shaft below said sleeve, and means for controlling the vertical position of said sleeve between said upper and said lower disk means.

2. An apparatus as claimed in claim 1, wherein said dish is provided with a central cut out portion of circular shape, and said first body is substantially hemispherical and hollow, said apparatus including a speed reducing motor assembly housed inside said first body, said sleeve for controlling said third body being supported above said first body.

3. An apparatus as claimed in claim 2 wherein said motor is provided with a power supply circuit and a switch means mounted internally of said casing, said apparatus including a rotatably driven toothed wheel, a lug provided on said toothed wheel coacting with said switch means to operate said switch means as said wheel rotates, said second drive means including a revolving tooth for engaging said toothed wheel to rotate said toothed wheel.

4. An apparatus as claimed in claim 2, wherein said sleeve is provided with a flange, said apparatus including a ball bearing interposed between said sleeve and said flange, the latter being disposed between two disks, one disk of which being integral with the shaft driving said first body, the other disk being integral with the shaft driving said second body, said sleeve being adapted to be moved axially, so that said flange can be brought into contact with either of said disks, and means provided for holding said sleeve normally in neutral position.

5. An apparatus as claimed in claim 4, wherein said means for controlling the vertical position of said sleeve includes an upper and lower auxiliary sleeve disposed end to end, each provided with contacting surfaces in coaxial relationship with the shafts driving said first body and said second body, the contacting surfaces of said auxiliary sleeves having helical sections, the lower auxiliary sleeve being stationary, the upper sleeve acting to support said sleeve driving said third body and adapted to be vertically displaced in either direction, by means of said control lever accessible from the outside of said apparatus.

6. An apparatus as claimed in claim 1 wherein said means for controlling the vertical position of said sleeve includes means for pivotally supporting a lever, said lever provided with a free end and a bifurcated portion, said sleeve being provided with a circumferential groove being embraced by said bifurcated portion, said apparatus including a protective casing provided with a slot through which the free end of said lever protrudes outwardly for operator manipulation, and a transparent cover mounted on said casing for viewing said bodies.

7. An apparatus as claimed in claim 1 wherein said second body is provided with a shock resilient shell.

8. An apparatus as claimed in claim 1 wherein said third body is provided with a shock resilient shell.

9. An apparatus as claimed in claim 1, wherein said pair of legs of said free end of said forked limb fixedly connected to said sleeve are spaced apart by a distance smaller than a dimension of said third body taken transversely of said legs, said third body being provided with runners supported by said legs, said legs being bent upwardly so that the resultant of the gravity acting on said third body and of the reaction generated by said legs is a centripetal force, which is inversely proportional to the square of the distance between said third body and the vertical axis of said first body.

10. An apparatus as claimed in claim 1 wherein said third body supported by said forked limb is movable in opposite directions along said forked limb under the action of the resultant of centrifugal force and centripetal force generated by said apparatus.

References Cited

UNITED STATES PATENTS

| | | | |
|---|---|---|---|
| 2,949,682 | 8/1960 | Humbert | 273—118 X |
| 3,196,558 | 7/1965 | Webb | 35—45 |
| 3,208,185 | 9/1965 | Silvera | 46—241 |

JEROME SCHNALL, Primary Examiner

P. V. WILLIAMS, Assistant Examiner

U.S. Cl. X.R.

35—12; 46—241; 272—31; 273—118